(12) United States Patent
Noguchi et al.

(10) Patent No.: US 7,619,029 B1
(45) Date of Patent: Nov. 17, 2009

(54) FIBER COMPOSITE MATERIAL AND METHOD OF PRODUCING THE SAME

(75) Inventors: Toru Noguchi, Ueda (JP); Akira Magario, Ueda (JP)

(73) Assignee: Nissin Kogyo Co., Ltd., Ueda (JP)

( * ) Notice: Subject to any disclaimer, the term of this patent is extended or adjusted under 35 U.S.C. 154(b) by 531 days.

(21) Appl. No.: 11/475,033

(22) Filed: Jun. 27, 2006

(30) Foreign Application Priority Data

Jun. 30, 2005 (JP) ............................. 2005-191865
Apr. 27, 2006 (JP) ............................. 2006-123292

(51) Int. Cl.
*D01F 9/12* (2006.01)

(52) U.S. Cl. ..................... 524/495; 524/496; 423/447.2

(58) Field of Classification Search .................. 524/495
See application file for complete search history.

(56) References Cited

U.S. PATENT DOCUMENTS

| | | | |
|---|---|---|---|
| 4,833,305 A * | 5/1989 | Mashimo et al. ............. 219/549 |
| 5,611,964 A | 3/1997 | Friend et al. |
| 5,849,130 A | 12/1998 | Browne |
| 6,949,237 B2 * | 9/2005 | Smalley et al. ........... 423/447.3 |
| 2004/0144963 A1 | 7/2004 | Braig et al. |
| 2004/0164462 A1 | 8/2004 | Wada et al. |
| 2004/0241440 A1 * | 12/2004 | Noguchi et al. ............. 428/364 |
| 2005/0075443 A1 | 4/2005 | Noguchi et al. |
| 2005/0192396 A1 | 9/2005 | Noguchi et al. |
| 2005/0194115 A1 | 9/2005 | Noguchi et al. |
| 2006/0016522 A1 | 1/2006 | Noguchi et al. |
| 2006/0057386 A1 | 3/2006 | Magario et al. |
| 2006/0057387 A1 | 3/2006 | Magario et al. |
| 2006/0062986 A1 | 3/2006 | Magario et al. |
| 2006/0079627 A1 | 4/2006 | Noguchi et al. |
| 2006/0155009 A1 | 7/2006 | Magario et al. |
| 2007/0100058 A1 * | 5/2007 | Noguchi et al. ............. 524/496 |

FOREIGN PATENT DOCUMENTS

| | | |
|---|---|---|
| EP | 1 114 718 A1 | 7/2001 |
| JP | A-5-503723 | 6/1993 |
| JP | A-2003-239171 | 8/2003 |
| JP | A-2003-322218 | 11/2003 |
| JP | A-2005-068386 | 3/2005 |
| JP | A-2005-122111 | 5/2005 |
| WO | WO 91/01621 A2 | 2/1991 |

(Continued)

OTHER PUBLICATIONS

U.S. Appl. No. 11/180,573, filed Jul. 14, 2005.

(Continued)

*Primary Examiner*—Patrick Ryan
*Assistant Examiner*—Brent Thomas
(74) *Attorney, Agent, or Firm*—Oliff & Berridge, PLC (57) ABSTRACT

A fiber composite material, including: an elastomer; carbon nanofibers having an average diameter of 0.7 to 15 nm and an average length of 0.5 to 100 micrometers; and fibers having an average diameter of 1 to 100 micrometers and an aspect ratio of 50 to 500, the carbon nanofibers and the fibers being dispersed in the elastomer, and the elastomer including an unsaturated bond or a group exhibiting affinity to the carbon nanofibers.

14 Claims, 2 Drawing Sheets

FOREIGN PATENT DOCUMENTS

| | | |
|---|---|---|
| WO | WO 00/64668 | 11/2000 |
| WO | WO 2004/056919 A1 | 7/2004 |

OTHER PUBLICATIONS

U.S. Appl. No. 11/183,753, filed Jul. 19, 2005.
U.S. Appl. No. 11/282,614, filed Nov. 21, 2005.
U.S. Appl. No. 11/385,670, filed Mar. 22, 2006.
U.S. Appl. No. 11/475,033, filed Jun. 27, 2006.
K. Endoh et al., "Observation of Carbon nanotube/Elastomer Composites by Atomic Force Microscopy"; IRC Yokohama; 28-S6-08 (2005).
Noguchi et al., "Rheological Properties for Carbon Nanotube/Elastomer Nanocomposites"; SRJ The $53^{rd}$ Rheology Symposium; pp. 186-187 (2005).
Noguchi et al., "Mechanical Properties and Cellulation of Carbon Nanotube/Elastomer Composites"; The Japan Society of Applied Physics and Related Societies, Spring Meeting; 22a-Zp-6; p. 522 (2006).
Magario et al., "Reinforcement and Cellualtion of VGCF/Elastomer Composites"; $55^{th}$ SPSJ Annual Meeting; Vol. 55; No. 1; 1Ph106 (2006).
Ueki et al., "Mechanical Properties and Thermal Expansion of VGCF/ElastomerComposites"; $55^{th}$ SPSJ Annual Meeting; vol. 55; No. 1; p. 107 (2006).
Niikura et al., "Observation of Carbon Nanotube/Elastomer Composites by Atomic Force Microscope [2]"; $55^{th}$ SPSJ Annual Meeting; vol. 55; No. 1; p. 934 (2006).
Magario et al., "Thermal Expansion of VGCF/Elastomer Composites (1)"; The Society of Rubber Industry, Japan $73^{rd}$ Annual Meeting; p. 43 (2006).
Noguchi et al., "Dynamic Viscoelasticity and Cellulation of VGCF/Elastomer Composites"; The Society of Rubber Industry, Japan $73^{rd}$ Annual Meeting; p. 44 (2006).
U.S. Appl. No. 11/385,670, filed on Mar. 22, 2006 in the name of Toru Nogouchi et al.
U.S. Appl. No. 11/475,032, filed on Jun. 27, 2006 in the name of Toru Noguchi et al.

* cited by examiner

FIG.1

FIG.2 though it is difficult to provide a composite material using fibers with a thermal expansion isotropy in comparison with a composite material using particles. Therefore, the application is limited to a product in the shape of a sheet or a plate, or a three-dimensional structure such as a biaxial or triaxial weave must be formed using fibers. The coefficient of linear expansion of an elastomer changes to a large extent under different temperature conditions. In particular, since an elastomer thermally deteriorates at a relatively low temperature due to molecular chain scission, the coefficient of linear expansion rapidly increases in the vicinity of such a temperature (the temperature at which thermal deterioration starts is hereinafter called "heat resistant temperature"). Therefore, a composite material using an elastomer matrix which exhibits a low and stable coefficient of linear expansion over a wide temperature range has not been proposed.

The inventors of the invention have proposed a fiber composite material in which carbon nanofibers are uniformly dispersed (e.g. JP-A-2005-68386). In this fiber composite material, the dispersibility of the carbon nanofibers exhibiting high aggregating properties is improved by mixing the elastomer and the carbon nanofibers.

FIBER COMPOSITE MATERIAL AND METHOD OF PRODUCING THE SAME

Japanese Patent Application No. 2005-191865, filed on Jun. 30, 2005, and Japanese Patent Application No. 2006-123292, filed on Apr. 27, 2006, are hereby incorporated by reference in their entirety.

BACKGROUND OF THE INVENTION

The present invention relates to a fiber composite material and a method of producing the same.

A composite material is generally provided with physical properties corresponding to the application by combining a matrix material and reinforcing fibers or particles. In the fields of semiconductor manufacturing instruments, optical instruments, microprocessing instruments, and the like, a reduction in the effects of thermal expansion of parts has been demanded. To deal with this demand, various composite materials using reinforcing fibers such as carbon fibers have been proposed (see WO 00/64668, for example).

SUMMARY

According to a first aspect of the invention, there is provided a fiber composite material, comprising:
an elastomer;
carbon nanofibers having an average diameter of 0.7 to 15 nm and an average length of 0.5 to 100 micrometers; and
fibers having an average diameter of 1 to 100 micrometers and an aspect ratio of 50 to 500,
the carbon nanofibers and the fibers being dispersed in the elastomer, and the elastomer including an unsaturated bond or a group exhibiting affinity to the carbon nanofibers.

According to a second aspect of the invention, there is provided a method of producing a fiber composite material, the method comprising:
mixing carbon nanofibers having an average diameter of 0.7 to 15 nm and an average length of 0.5 to 100 micrometers and fibers having an average diameters of 1 to 100 micrometers and an aspect ratio of 50 to 500 into an elastomer including an unsaturated bond or a group exhibiting affinity to the carbon nanofibers; and
dispersing the carbon nanofibers and the fibers by applying a shear force.

DETAILED DESCRIPTION OF THE EMBODIMENT

The invention may provide a fiber composite material in which fibers and carbon nanofibers are uniformly dispersed and which exhibits a small thermal expansion over a wide temperature range, and a method of producing the same.

According to one embodiment of the invention, there is provided a fiber composite material, comprising:
an elastomer;
carbon nanofibers having an average diameter of 0.7 to 15 nm and an average length of 0.5 to 100 micrometers; and
fibers having an average diameter of 1 to 100 micrometers and an aspect ratio of 50 to 500,
the carbon nanofibers and the fibers being dispersed in the elastomer, and the elastomer including an unsaturated bond or a group exhibiting affinity to the carbon nanofibers.

According to one embodiment of the invention, there is provided a method of producing a fiber composite material, the method comprising:
mixing carbon nanofibers having an average diameter of 0.7 to 15 nm and an average length of 0.5 to 100 micrometers and fibers having an average diameters of 1 to 100 micrometers and an aspect ratio of 50 to 500 into an elastomer including an unsaturated bond or a group exhibiting affinity to the carbon nanofibers; and
dispersing the carbon nanofibers and the fibers by applying a shear force.

According to the fiber composite material and the method of producing the same in this embodiment, the fiber composite material exhibits a small and stable coefficient of linear expansion over a wide temperature range. Therefore, the fiber composite material may be used in combination with a material having a small coefficient of linear expansion, such as a metal or a ceramic. In particular, since the fiber composite material can be used over a wide temperature range in comparison with a common elastomer, a product can be easily designed in which the fiber composite material is combined with a material having a small coefficient of linear expansion.

According to the fiber composite material and the method of producing the same in this embodiment, since the unsaturated bond or group of the elastomer is bonded to an active site of the carbon nanofiber, in particular to a terminal radical of the carbon nanofiber to reduce the aggregating force of the carbon nanofibers, whereby the dispersibility of the carbon nanofibers can be increased. In the resulting fiber composite material, the carbon nanofibers are uniformly dispersed in the elastomer as a matrix.

In this fiber composite material, the fiber composite material may include the carbon nanofibers in an amount of 1 to 30 vol % and the fibers in an amount of 3 to 40 vol %, and may have an average coefficient of linear expansion of 100 ppm (1/K) or less and a differential coefficient of linear expansion of 120 ppm (1/K) or less at −80 to 300° C.

By reinforcing the entire elastomer with the fibers, thermal expansion of the fiber composite material can be reduced by using a relatively small amount of carbon nanofibers, whereby the coefficient of linear expansion can be decreased.

In this fiber composite material, the fiber composite material may have a ratio of a coefficient of linear expansion in an arbitrary direction X and a coefficient of linear expansion in a direction Y perpendicular to the direction X of 0.7 to 1.3 at −80 to 300° C.

The fiber composite material according to this embodiment does not exhibit anisotropy of the coefficient of linear expansion due to the uniformly dispersed carbon nanofibers and fibers. Therefore, the fiber composite material according to this embodiment may be used not only in the form of a sheet or plate, but also in various other forms.

In this fiber composite material, the carbon nanofibers may have an aspect ratio of 50 or more.

In this fiber composite material, the fibers may be natural fibers, metal fibers, or synthetic fibers.

In this fiber composite material, the fiber composite material may have a heat resistant temperature of 300° C. or more. Since the fiber composite material has a heat resistant temperature as high as 300° C. or more, the fiber composite material may also be utilized for parts used at a high temperature.

The elastomer according to this embodiment may be a rubber elastomer or a thermoplastic elastomer. When using a rubber elastomer, the elastomer may be in a crosslinked form or an uncrosslinked form. Note that it is preferable to use an elastomer in an uncrosslinked form.

Embodiments of the invention are described below in detail with reference to the drawings.

The elastomer preferably has characteristics such as a certain degree of molecular length and flexibility in addition to high affinity to the carbon nanofibers. When dispersing the carbon nanofibers in the elastomer by applying a shear force, it is preferable that the carbon nanofibers and the elastomer be mixed at as high a shear force as possible.

(I) Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer exhibits excellent elasticity for dispersing the carbon nanofibers. The elastomer can easily enter the space between the aggregated carbon nanofibers due to viscosity, and can separate the carbon nanofibers due to elasticity. If the molecular weight of the elastomer is less than 5,000, since the elastomer molecules cannot be sufficiently entangled, the effect of dispersing the carbon nanofibers is reduced due to low elasticity, even if a shear force is applied in the subsequent step. If the molecular weight of the elastomer is greater than 5,000,000, since the elastomer becomes too hard, it is difficult to process the elastomer.

The network component of the elastomer in an uncrosslinked form has a spin-spin relaxation time (T2n/30° C.) measured at 30° C. by a Hahn-echo method using a pulsed nuclear magnetic resonance (NMR) technique of preferably 100 to 3,000 microseconds, and still more preferably 200 to 1,000 microseconds. If the elastomer has a spin-spin relaxation time (T2n/30° C.) within the above range, the elastomer is flexible and has a sufficiently high molecular mobility. That is, the elastomer exhibits an appropriate elasticity for dispersing the carbon nanofibers. Moreover, since the elastomer exhibits viscosity, when mixing the elastomer and the carbon nanofibers, the elastomer can easily enter the space between the carbon nanofibers due to high molecular mobility. If the spin-spin relaxation time (T2n/30° C.) is shorter than 100 microseconds, the elastomer cannot have a sufficient molecular mobility. If the spin-spin relaxation time (T2n/30° C.) is longer than 3,000 microseconds, since the elastomer tends to flow and exhibits a low elasticity, it is difficult to disperse the carbon nanofibers.

The network component of the elastomer in a crosslinked form preferably has a spin-spin relaxation time (T2n) measured at 30° C. by the Hahn-echo method using the pulsed NMR technique of 100 to 2,000 microseconds. The reasons therefor are the same as for the uncrosslinked form. Specifically, when crosslinking an uncrosslinked form which satisfies the above conditions, the spin-spin relaxation time (T2n) of the resulting crosslinked form almost falls within the above range.

The spin-spin relaxation time obtained by the Hahn-echo method using the pulsed NMR technique is an index of the molecular mobility of a substance. In more detail, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may also be used instead of the Hahn-echo method. Since the elastomer according to this embodiment has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to a terminal radical of the carbon nanofiber, or the elastomer has properties of readily producing such a radical or group. The unsaturated bond or group may be at least one unsaturated bond or group selected from a double bond, a triple bond, and functional groups such as alpha-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. Since the carbon nanofiber has a forced structure, a defect easily occurs, and a radical or a functional group tends to be formed at the defect. In this embodiment, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This allows the carbon nanofibers to be easily dispersed by overcoming the aggregating force of the carbon nanofibers. When mixing the elastomer and the carbon nanofibers, free radicals produced due to breakage of the elastomer molecules attack the defects of the carbon nanofibers to produce radicals on the surfaces of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. In particular, a highly polar elastomer which readily produces free radicals during mixing of the elastomer, such as natural rubber (NR) or nitrile rubber (NBR), is preferable. An elastomer having a low polarity, such as ethylene propylene rubber (EPDM), may also be used in this embodiment, since such an elastomer also produces free radicals by setting the mixing temperature at a relatively high temperature (e.g. 50 to 150° C. for EPDM).

The elastomer according to this embodiment may be a rubber elastomer or a thermoplastic elastomer. When using a rubber elastomer, the elastomer may be in a crosslinked form or an uncrosslinked form. Note that it is preferable to use an elastomer in an uncrosslinked form.

(II) Fiber and Carbon Nanofiber

The fibers exhibit flexibility and excellent bending properties and have an average diameter of 1 to 100 micrometers and an aspect ratio of 50 to 500. If the average diameter of the fibers is less than 1 micrometer, processing (mixing) is difficult. If the average diameter of the fibers is greater than 100 micrometers, the fibers exhibit an insufficient reinforcing effect.

The carbon nanofibers have an average diameter of 0.7 to 15 nm and an average length of 0.5 to 100 micrometers. If the average diameter of the carbon nanofibers is less than 0.7 nm, the carbon nanofibers may be damaged during mixing. If the average diameter of the carbon nanofibers is greater than 15 nm, the confinement effect due to the carbon nanofibers and the fibers is not obtained, whereby the reinforcing effect becomes insufficient. If the average length of the carbon nanofibers is less than 0.5 micrometers, the reinforcing effect is insufficient. If the average length of the carbon nanofibers is greater than 100 micrometers, processing (mixing) is difficult.

The carbon nanofibers preferably have an aspect ratio of 50 or more, and still more preferably 100 to 20,000. If the aspect ratio is less than 50, the effect of confining the elastomer is not obtained, whereby the resulting fiber composite material may flow or be thermally deteriorated at 300° C. or less, for example.

It is preferable that the fiber composite material include the carbon nanofibers in an amount of 1 to 30 vol %, and still more preferably 1 to 15 vol %, and include the fibers in an amount of 3 to 40 vol %. A fiber composite material including the fibers and the carbon nanofibers at such a volume ratio exhibits a low and stable coefficient of linear expansion at −80 to 300° C., that is, an average coefficient of linear expansion of 100 ppm (1/K) or less and a differential coefficient of linear expansion of 120 ppm (1/K) or less. If the amount of carbon nanofibers is less than 1 vol %, since the elastomer cannot be restrained, the coefficient of linear expansion cannot be reduced. The coefficient of linear expansion can be reduced by increasing the amount of carbon nanofibers to greater than 15 vol %. In practice, it is not desirable to use the carbon nanofibers in an amount of greater than 30 vol %, since a large amount of expensive carbon nanofibers is required. If the amount of fibers is less than 3 vol %, the coefficient of linear expansion cannot be reduced without adding a large amount of carbon nanofibers. If the amount of fibers is greater than 40 vol %, processing (mixing) becomes difficult.

As the fiber, a flexible fiber exhibiting excellent bending properties is preferable. For example, a natural fiber, metal fiber, synthetic fiber, or combination of these fibers may be used.

As the natural fiber, a vegetable fiber such as cotton or hemp or an animal fiber such as sheep wool or silk may be appropriately used. As the metal fiber, a stainless steel fiber, copper fiber, or the like may be appropriately used. As the synthetic fiber, an aliphatic polyamide fiber or the like may be used. Note that a polyester fiber, aromatic polyamide fiber, ceramic fiber, and the like are not suitable due to rigidity and the absence of bending properties.

As examples of the carbon nanofiber, a carbon nanotube and the like can be given. The carbon nanotube has a single-wall structure in which a graphene sheet of a hexagonal carbon layer is closed in the shape of a cylinder, or a multiwall structure in which the cylindrical structures are nested. Specifically, the carbon nanotube may be formed only of either the single-wall structure or the multi-layer structure, or may have the single-wall structure and the multiwall structure in combination. A carbon material having a partial carbon nanotube structure may also be used. The carbon nanotube may also be called a graphite fibril nanotube.

A single-wall carbon nanotube or a multiwall carbon nanotube is produced to a desired size using an arc discharge method, laser ablation method, vapor-phase growth method, or the like.

In the arc discharge method, an arc is discharged between electrode materials made of carbon rods in an argon or hydrogen atmosphere at a pressure lower than atmospheric pressure to a small extent to obtain a multiwall carbon nanotube deposited on the cathode. When a catalyst such as nickel/cobalt is mixed into the carbon rod and an arc is discharged, a single-wall carbon nanotube is obtained from soot adhering to the inner side surface of the processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-wall carbon nanotube.

In the vapor-phase growth method, a carbon nanotube is synthesized by thermally decomposing a hydrocarbon such as benzene or toluene in a vapor phase. As specific examples of the vapor-phase growth method, a floating catalyst method, zeolite-supported catalyst method, and the like can be given.

The carbon nanofibers may be provided with improved adhesion to and wettability with the elastomer by subjecting the carbon nanofibers to a surface treatment such as an ion-injection treatment, sputter-etching treatment, or plasma treatment before mixing the carbon nanofibers into the elastomer.

(III) Mixing Fibers and Carbon Nanofibers into Elastomer and Dispersing Fibers and Carbon Nanofibers by Applying Shear Force This step may be carried out using an open-roll method, an internal mixing method, a multi-screw extrusion kneading method, or the like.

In this embodiment, an example using an open-roll method with a roll distance of 0.5 mm or less is illustrated as the step of dispersing the carbon nanofibers in the elastomer by applying a shear force.

Figure 1:
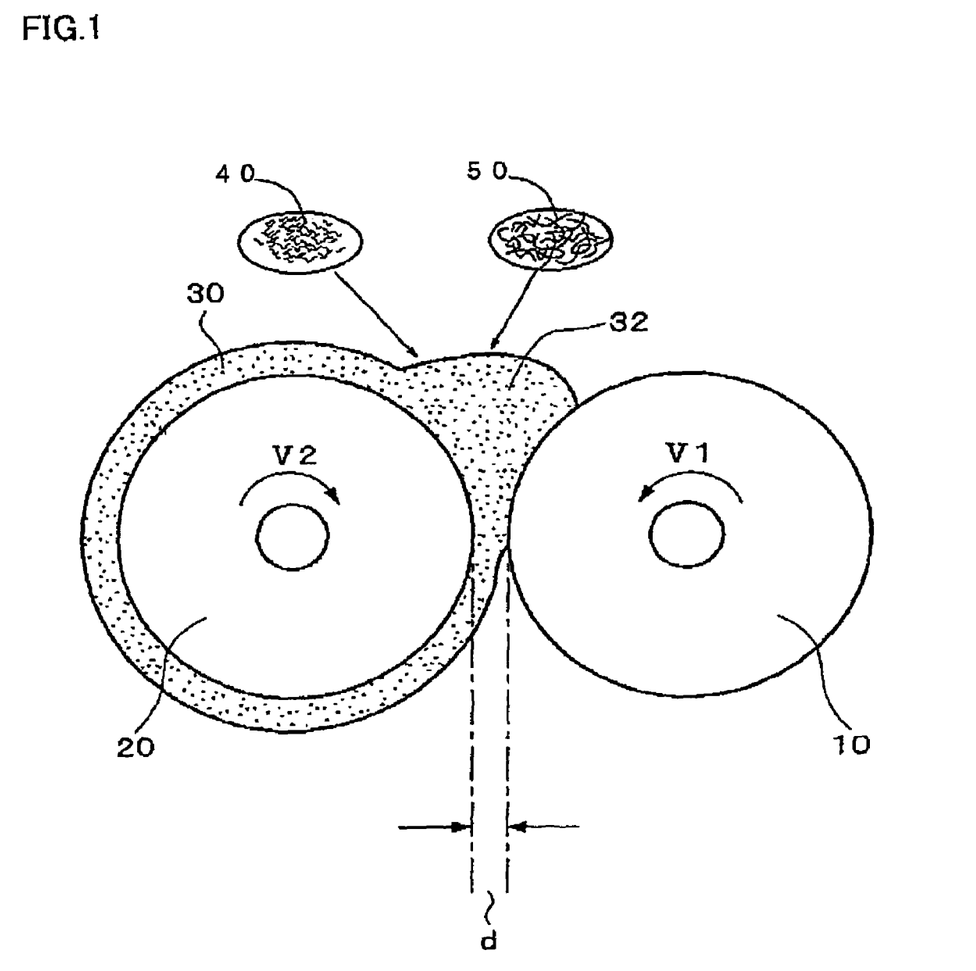
FIG. 1 is a view schematically showing a method of mixing an elastomer and carbon nanofibers utilizing an open-roll method according to one embodiment of the invention.

FIG. 1 is a view schematically showing the open-roll method using two rolls. In FIG. 1, a reference numeral 10 indicates a first roll, and a reference numeral 20 indicates a second roll. The first roll 10 and the second roll 20 are disposed at a predetermined distance d (e.g. 1.5 mm). The first and second rolls are rotated normally or reversely. In the example shown in FIG. 1, the first roll 10 and the second roll 20 are rotated in the directions indicated by the arrows.

When causing an elastomer 30 to be wound around the second roll 20 while rotating the first and second rolls 10 and 20, a bank 32 of the elastomer is formed between the rolls 10 and 20. After the addition of fibers 50 and carbon nanofibers 40 to the bank 32, the first and second rolls 10 and 20 are rotated to obtain a mixture in which the fibers and the carbon nanofibers are mixed with the elastomer. The mixture is then removed from the open rolls. After reducing the distance d between the first roll 10 and the second roll 20 to preferably 0.5 mm or less, and still more preferably 0.1 to 0.5 mm, the mixture of the elastomer and the carbon nanofibers is supplied to the open rolls and tight-milled. Tight milling is preferably performed about ten times, for example. When the surface velocity of the first roll 10 is indicated by V1 and the surface velocity of the second roll 20 is indicated by V2, the surface velocity ratio (V1/V2) of the first roll 10 to the second roll 20 during tight milling is preferably 1.05 to 3.00, and still more preferably 1.05 to 1.2. A desired shear force can be obtained by using such a surface velocity ratio.

As the order of adding the fibers and the carbon nanofibers to the elastomer, it is preferably to add the fibers before adding the carbon nanofibers.

This causes a high shear force to be applied to the elastomer 30 so that the aggregated carbon nanofibers 40 are separated in such a manner that the carbon nanofibers 40 are removed by the elastomer molecules one by one and are dispersed in the elastomer 30.

In this step, the elastomer and the carbon nanofibers are mixed at a relatively low temperature of preferably 0 to 50° C., and still more preferably 5 to 30° C. in order to obtain as high a shear force as possible. When using EPDM as the elastomer, it is preferable to perform two-stage mixing steps. In the first mixing step, EPDM and the carbon nanofibers are mixed at a first temperature which is 50 to 100° C. lower than the temperature in the second mixing step in order to obtain as high a shear force as possible. The first temperature is preferably 0 to 50° C., and still more preferably 5 to 30° C. A second temperature of the rolls is set at a relatively high temperature of 50 to 150° C. so that the dispersibility of the carbon nanofibers can be improved.

In this step, free radicals are produced in the elastomer shorn by the shear force and attack the surfaces of the carbon nanofibers, whereby the surfaces of the carbon nanofibers are activated. When using natural rubber (NR) as the elastomer, the natural rubber (NR) molecule is cut while being mixed by the rolls to have a molecular weight lower than the molecular weight before being supplied to the open rolls. Radicals are produced in the cut natural rubber (NR) molecules and attack the surfaces of the carbon nanofibers during mixing, whereby the surfaces of the carbon nanofibers are activated.

Since the elastomer according to this embodiment has the above-described characteristics, that is, the above-described molecular configuration (molecular length), elasticity due to molecular motion, viscosity, and particularly chemical interaction with the carbon nanofibers, dispersion of the carbon nanofibers is facilitated. Therefore, a fiber composite material exhibiting excellent dispersibility and dispersion stability (i.e. dispersed carbon nanofibers rarely reaggregate) of the carbon nanofibers can be obtained. In more detail, when mixing the elastomer and the carbon nanofibers, the elastomer exhibiting viscosity enters the space between the carbon nanofibers, and a specific portion of the elastomer bonds to a highly active site of the carbon nanofiber through chemical interaction. When a high shear force is applied to the mixture of the elastomer having an appropriately long molecular length and high molecular mobility (elastic) and the carbon nanofibers, the carbon nanofibers move accompanying deformation of the elastomer, and the elastomer exhibits a restoring force due to elasticity after shearing, whereby the aggregated carbon nanofibers are separated and dispersed in the elastomer. According to this embodiment, when the mixture is forced out from the narrow space between the rolls, the mixture is deformed to have a thickness greater than the distance between the rolls due to the restoring force of the elastomer resulting from the elasticity. The deformation causes the mixture to which the strong shearing force is applied to flow more complexly, whereby the carbon nanofibers are dispersed in the elastomer. The dispersed carbon nanofibers do not reaggregate due to the chemical interaction with the elastomer, whereby the carbon nanofibers are provided with excellent dispersion stability.

In this step, the above-mentioned internal mixing method or multi-screw extrusion kneading method may be used instead of the open-roll method. In other words, it suffices that this step apply a shear force to the elastomer sufficient to separate the aggregated carbon nanofibers and to produce radicals due to breakage of the elastomer molecules.

After the above step of dispersing the carbon nanofibers in the elastomer, an extrusion step, molding step, crosslinking step, and the like may be carried out using a known method.

In the step of dispersing the carbon nanofibers in the elastomer, or before or after this step, a compounding ingredient usually used in processing of an elastomer such as rubber may be added. As the compounding ingredient, a known compounding ingredient may be used. As examples of the compounding ingredient, a coloring agent (e.g. fiber), filler (e.g. calcium carbonate), reinforcing agent (e.g. silica, talc, and clay), crosslinking agent (e.g. peroxide), vulcanizing agent, vulcanization accelerator, vulcanization retarder, softener, plasticizer, curing agent, reinforcing agent, filler, aging preventive, and the like can be given.

(IV) Fiber Composite Material Obtained by (III)

The fiber composite material according to this embodiment includes an elastomer, 3 to 40 vol % of fibers, and 1 to 30 vol % of carbon nanofibers, the fibers and the carbon nanofibers being dispersed in the elastomer, the fiber composite material having an average coefficient of linear expansion of 100 ppm (1/K) or less and a differential coefficient of linear expansion of 120 ppm (1/K) or less.

The average coefficient of linear expansion of the fiber composite material differs depending on the volume ratio of the fibers and the carbon nanofibers. The average coefficient of linear expansion decreases as the volume ratio of the fibers and the carbon nanofibers increases, and the average coefficient of linear expansion increases as the volume ratio of the fibers and the carbon nanofibers decreases. Specifically, the average coefficient of linear expansion of the fiber composite material can be controlled by the volume ratio of the fibers and the carbon nanofibers. If the amount of carbon nanofibers is less than 1 vol %, since the elastomer cannot be restrained, the coefficient of linear expansion cannot be reduced. The coefficient of linear expansion can be reduced by increasing the amount of carbon nanofibers to greater than 15 vol %. In practice, it is not desirable to use the carbon nanofibers in an amount of greater than 30 vol %, since a large amount of expensive carbon nanofibers is required. If the amount of fibers is less than 3 vol %, the coefficient of linear expansion cannot be reduced without adding a large amount of carbon nanofibers. If the amount of fibers is greater than 40 vol %, processing (mixing) becomes difficult.

The carbon nanofibers and the fibers have a correlation in regard to the volume ratio. A low coefficient of linear expansion is maintained by increasing the amount of the fibers when the amount of the carbon nanofibers is small and increasing the amount of the carbon nanofibers when the amount of the fibers is small.

The differential coefficient of linear expansion of the fiber composite material is as low as 120 ppm (1/K) or less and is stable over a wide temperature range, so that an instantaneous increase in thermal expansion does not occur. The maximum value of the differential coefficient of linear expansion of the fiber composite material differs depending on the volume ratio of the fibers and the carbon nanofibers. The maximum value of the differential coefficient of linear expansion decreases as the volume ratio of the fibers and the carbon nanofibers increases, and the maximum value of the differential coefficient of linear expansion increases as the volume ratio of the fibers and the carbon nanofibers decreases. Specifically, the maximum value of the differential coefficient of linear expansion of the fiber composite material can be controlled by the volume ratio of the fibers and the carbon nanofibers. If the amount of carbon nanofibers is less than 1 vol %, and fiber composite material exhibits an unstable coefficient of linear expansion at −80 to 300° C. and exhibits a heat resistant temperature of lower than 300° C. When the volume ratio of the carbon nanofibers is less than 15 vol % and the volume ratio of the fibers is less than 3 vol %, the maximum value of the differential coefficient of linear expansion exceeds 120 ppm (1/K). As a result, the differential coefficient of linear expansion changes on a large extent in the temperature range of −80 to 300° C., whereby thermal expansion shows an unstable behavior in a specific temperature range.

The fiber composite material according to this embodiment has a ratio of the coefficient of linear expansion in an arbitrary direction X to the coefficient of linear expansion in a direction Y perpendicular to the direction X of 0.7 to 1.3 at −80 to 300° C.

When the arbitrary direction X is the rotational direction of the open roll, rigid fibers such as polyester fibers are generally oriented to exhibit anisotropy in which the coefficient of linear expansion significantly decreases in the direction Y perpendicular to the direction X. On the other hand, the fiber composite material according to this embodiment exhibits an isotropic coefficient of linear expansion.

In the fiber composite material according to this embodiment, the elastomer as the matrix is surrounded by the fibers and the carbon nanofibers, whereby a restraint region is formed. In the restraint region, the movement of the elastomer is limited and restrained. In a fiber composite material including 1 to 30 vol % of thin carbon nanofibers with an average diameter of 0.7 to 15 nm and 3 to 40 vol % of fibers, since the restraint region becomes significantly small in an arbitrary plane, the elastomer is restrained as if the elastomer is crosslinked. Moreover, the restraint region formed by the carbon nanofibers can provide a coefficient of linear expansion stable against heat over a wide temperature range (e.g. −80 to 300° C.).

The fiber composite material may be either an uncrosslinked form or a crosslinked form, which may be appropriately selected depending on the application. When the fiber composite material is an uncrosslinked form, the fiber composite material may be recycled.

The fiber composite material according to this embodiment exhibits a heat resistant temperature of 300° C. or more.

The heat resistant temperature may be determined by a rapid increase in coefficient of linear expansion resulting from breakage of the molecular chain of the elastomer of the fiber composite material.

In the fiber composite material according to this embodiment, the fibers and the carbon nanofibers are uniformly dispersed in the elastomer as the matrix. In other words, the elastomer is restrained by the fibers and the carbon nanofibers. The mobility of the elastomer molecules restrained by the fibers and the carbon nanofibers is low in comparison with the case where the elastomer molecules are not restrained by the fibers and the carbon nanofibers. Therefore, the first spin-spin relaxation time (T2n), the second spin-spin relaxation time (T2nn), and the spin-lattice relaxation time (T1) of the fiber composite material according to this embodiment are shorter than those of an elastomer which does not include the fibers and the carbon nanofibers.

In a state in which the elastomer molecules are restrained by the fibers and the carbon nanofibers, the number of non-network components (non-reticulate chain components) is considered to be reduced for the following reasons. Specifically, when the molecular mobility of the elastomer is decreased over the entire elastomer by the fibers and the carbon nanofibers, since the number of non-network components which cannot easily move is increased, the non-network components tend to behave in the same manner as the network components. Moreover, since the non-network components (terminal chains) easily move, the non-network components tend to be adsorbed on the active sites of the fibers and the carbon nanofibers. It is considered that these phenomena decrease the number of non-network components.

Therefore, the fiber composite material according to this embodiment preferably has values within the following range measured by the Hahn-echo method using the pulsed NMR technique.

Specifically, it is preferable that the uncrosslinked fiber composite material have a first spin-spin relaxation time ($T_2n$) measured at 150° C. of 100 to 3,000 microseconds, a second spin-spin relaxation time ($T_2nn$) measured at 150° C. of 1,000 to 10,000 microseconds, and a fraction (fnn) of components having a second spin-spin relaxation time of less than 0.2.

It is preferable that the crosslinked fiber composite material have a first spin-spin relaxation time (T2n) measured at 150° C. of 100 to 2,000 microseconds, a second spin-spin relaxation time (T2nn) measured at 150° C. of zero or 1,000 to 5,000 microseconds, and a fraction (fnn) of components having a second spin-spin relaxation time of less than 0.2.

The spin-lattice relaxation time (T1) measured by the inversion recovery method using the pulsed NMR technique is an index of the molecular mobility of a substance together with the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer. Therefore, the fiber composite material, in which the fibers and the carbon nanofibers are uniformly dispersed, exhibit a reduced molecular mobility to exhibit T2n, T2nn, and fnn within the above ranges.

The fiber composite material according to this embodiment preferably has a flow temperature, determined by temperature dependence measurement of dynamic viscoelasticity, 20° C. or more higher than the flow temperature of the raw material elastomer. In the fiber composite material according to this embodiment, the fibers and the carbon nanofibers are uniformly dispersed in the elastomer. In other words, the elastomer is restrained by the fibers and the carbon nanofibers, as described above. In this state, the elastomer exhibits a molecular motion smaller than that of the elastomer which does not include the fibers and the carbon nanofibers, whereby flowability is decreased. The fiber composite material according to this embodiment having such flow temperature characteristics shows a small temperature dependence of dynamic viscoelasticity to exhibit excellent heat resistance.

The fiber composite material according to this embodiment exhibits stable thermal expansion characteristics over a wide temperature range, as described above. Moreover, the fiber composite material exhibits a small thermal expansion over a wide temperature range due to a small average coefficient of linear expansion. Since the maximum value of the differential coefficient of linear expansion of the fiber composite material is small, the fiber composite material is stable over a wide temperature range. Therefore, an instantaneous increase in thermal expansion does not occur.

Examples according to the invention and comparative examples are described below. Note that the invention is not limited to the following examples.

EXAMPLES 1 TO 8 AND COMPARATIVE EXAMPLES 1 TO 3

(1) Preparation of Sample

An elastomer shown in Table 1 was mixed with predetermined amount of fibers and carbon nanofibers using the open-roll method to obtain samples. As the samples, an uncrosslinked sample and a crosslinked sample were prepared using the following methods.

(a) Preparation of Uncrosslinked Sample

1) The elastomer was supplied to six-inch open rolls (roll temperature: 10 to 20° C.) and wound around the roll.

2) Fibers and carbon nanofibers (indicated by "CNT1" and "CNT13" in Table 1) were added to the elastomer. The roll distance was set at 1.5 mm.

3) After the addition of the fibers and the carbon nanofibers, the mixture of the elastomer, the fibers, and the carbon nanofibers was removed from the rolls.

4) After reducing the roll distance from 1.5 mm to 0.3 mm, the mixture was supplied to the rolls and tight-milled. The surface velocity ratio of the rolls was set at 1.1. Tight milling was repeatedly performed ten times.

5) After setting the roll distance at a predetermined distance (1.1 mm), the mixture subjected to tight milling was supplied to the rolls and sheeted.

Uncrosslinked samples of Examples 1 to 8 and Comparative Examples 1 to 3 were thus obtained. In Table 1, the raw material elastomer "NR" is natural rubber, and the raw material elastomer "EPDM" is ethylene-propylene rubber. In Table 1, "CNT1" indicates single-wall carbon nanotubes with an average diameter (fiber diameter) of about 1 nm and an average length of 1 to 10 micrometers, and "CNT13" indicates multiwall carbon nanotubes with an average diameter of about 13 nm and an average length of 1 to 25 micrometers. In Table 1, "cotton" indicates cotton yarn with an average diameter (fiber diameter) of about 10 micrometers and an average length of about 6 mm, "silk" indicates silk yarn with an average diameter of about 3 micrometers and an average length of about 6 mm, and "stainless steel fiber" indicates stainless steel fibers exhibiting high bending properties with an average diameter of about 10 micrometers and an average length of about 6 mm. In Examples 1 and 3 to 8 and Comparative Examples 1 to 3, 2 phr of a peroxide ("PO") was added to 100 phr of the elastomer as a crosslinking agent before adding the carbon nanofibers and the fibers. Example 2 is an uncrosslinked sample of Example 1.

(b) Preparation of Crosslinked Sample

The uncrosslinked samples of Examples 1 and 3 to 8 and Comparative Examples 1 to 3 cut into a die size were placed in a die and press-crosslinked at 175° C. and 100 kgf/cm$^2$ for 20 minutes.

Table 1 shows the volume ratio of each material added to the fiber composite materials of Examples 1 and 3 to 8 and Comparative Examples 1 to 3.

(2) Electron Microscope Observation

The dispersion state of the carbon nanofibers and the fibers in the uncrosslinked and crosslinked samples was observed using an electron microscope (SEM). The carbon nanofibers and the fibers were uniformly dispersed in the elastomer in all the samples.

Figure 2:
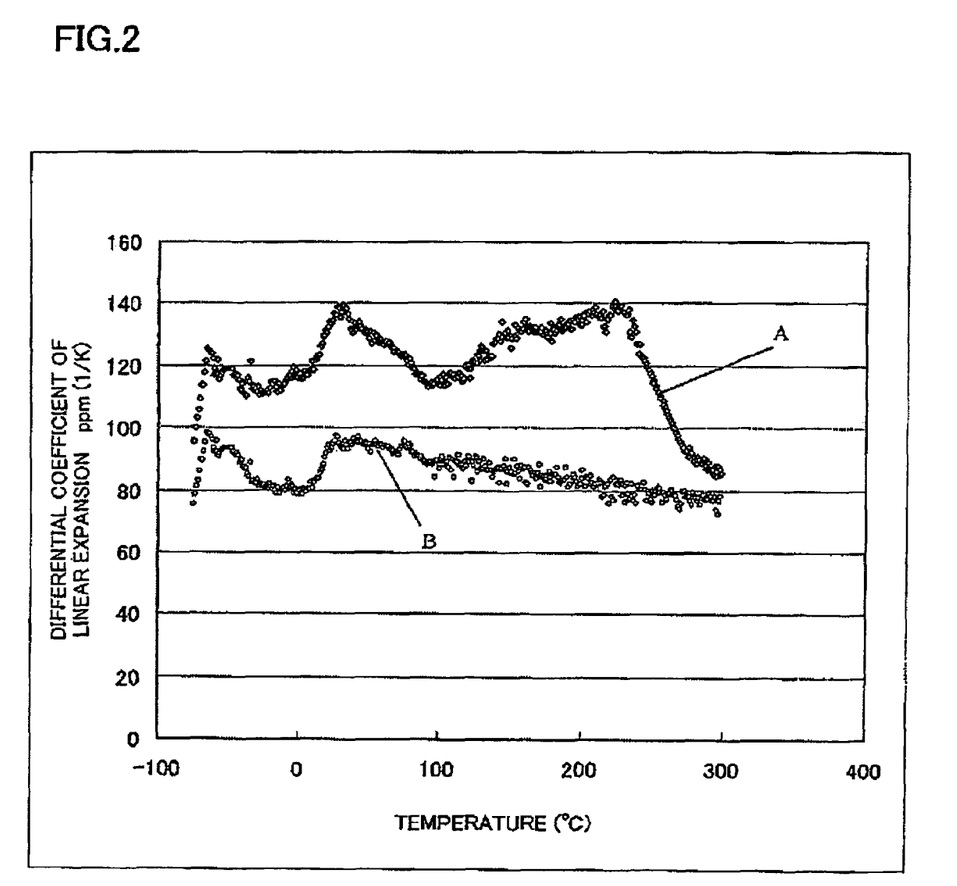
FIG. 2 is a graph of "temperature-differential coefficient of linear expansion" of Example 1 and Comparative Example 1.

(3) Measurement of Coefficient of Linear Expansion and Heat Resistant Temperature The uncrosslinked sample of Example 2 and the crosslinked samples of Examples 1 and 3 to 8 and Comparative Examples 1 to 3 were subjected to measurement of the coefficient of linear expansion and the heat resistant temperature. The measurement results are shown in Table 1. "TMASS" manufactured by SII was used as the measurement instrument. The measurement sample had dimensions of 1.5× 1.0×10 mm. The measurement load was 25 KPa, the measurement temperature was −80 to 350° C., and the temperature rise rate was 2° C./min. FIG. 2 is a graph of "temperature (°C.)–differential coefficient of linear expansion (ppm (1/K)" of Example 1 (B in FIG. 2) and Comparative Example 1 (A in FIG. 2).

TABLE 1

| | | Example | | | | | | | |
| --- | --- | --- | --- | --- | --- | --- | --- | --- | --- |
| | | 1 | 2 | 3 | 4 | 5 | 6 | 7 | 8 |
| Raw material elastomer | Type of elastomer | NR | NR | NR | NR | NR | NR | NR | EPDM |
| | Polar group | Double bond | Double bond | Double bond | Double bond | Double bond | Double bond | Double bond | Double bond Norbenzene |

TABLE 1-continued

|  |  |  | | | | | | | | |
|---|---|---|---|---|---|---|---|---|---|---|
| Fiber composite material | Uncrosslinked form | Average molecular weight | 3,000,000 | 3,000,000 | 3,000,000 | 3,000,000 | 3,000,000 | 3,000,000 | 3,000,000 | 200,000 |
| | | T2n (30° C.) (μsec) | 700 | 700 | 700 | 700 | 700 | 700 | 700 | 520 |
| | | T2n (150° C.) (μsec) | 5500 | 5500 | 5500 | 5500 | 5500 | 5500 | 5500 | 2200 |
| | | T2nn (150° C.) (μsec) | 18000 | 18000 | 18000 | 18000 | 18000 | 18000 | 18000 | 16000 |
| | | Tnn (150° C.) | 0.381 | 0.381 | 0.381 | 0.381 | 0.381 | 0.381 | 0.381 | 0.405 |
| | | Flow temperature (° C.) | 40 | 40 | 40 | 40 | 40 | 40 | 40 | 55 |
| | Volume ratio | CNT13 (vol %) | 15 | 15 | 8 | 3 | 0 | 3 | 3 | 8 |
| | | CNT1 (vol %) | 0 | 0 | 0 | 0 | 1 | 0 | 0 | 0 |
| | | Cotton (vol %) | 3 | 3 | 20 | 30 | 40 | 0 | 0 | 20 |
| | | Silk (vol %) | 0 | 0 | 0 | 0 | 0 | 30 | 0 | 0 |
| | | Stainless steel fiber (vol %) | 0 | 0 | 0 | 0 | 0 | 0 | 30 | 0 |
| | Crosslinking | | Cross-linked | Uncross-linked | Cross-linked | Cross-linked | Cross-linked | Cross-linked | Cross-linked | Cross-linked |
| | Mixing capability | | Mixed | Mixed | Mixed | Mixed | Mixed | Mixed | Mixed | Mixed |
| | Average coefficient of linear expansion (ppm/K) | | 76 | 74 | 74 | 69 | 75 | 63 | 61 | 78 |
| | Maimum value of differential coefficient of linear expansion (ppm/K) | | 98 | 95 | 95 | 97 | 98 | 89 | 88 | 99 |
| | Heat resistant temperature (° C.) | | 300 or more | 300 or more | 300 or more | 300 or more | 300 or more | 300 or more | 300 or more | 300 or more |
| | Low elongation stress ratio | | 1.15 | 1.13 | 1.22 | 1.25 | 1.29 | 1.2 | 1.29 | 1.25 |

| | | | Comparative Example | | |
|---|---|---|---|---|---|
| | | | 1 | 2 | 3 |
| Raw material elastomer | Type of elastomer | | NR | NR | NR |
| | Polar group | | Double bond | Double bond | Double bond |
| | Average molecular weight | | 3,000,000 | 3,000,000 | 3,000,000 |
| | Uncrosslinked form | T2n (30° C.) (μsec) | 700 | 700 | 700 |
| | | T2n (150° C.) (μsec) | 5500 | 5500 | 5500 |
| | | T2nn (150° C.) (μsec) | 18000 | 18000 | 18000 |
| | | Tnn (150° C.) | 0.381 | 0.381 | 0.381 |
| | | Flow temperature (° C.) | 40 | 40 | 40 |
| Fiber composite material | Volume ratio | CNT13 (vol %) | 14 | 0 | 3 |
| | | CNT1 (vol %) | 0 | 0.5 | 0 |
| | | Cotton (vol %) | 0 | 30 | 45 |
| | | Silk (vol %) | 0 | 0 | 0 |
| | | Stainless steel fiber (vol %) | 0 | 0 | 0 |
| | Crosslinking | | Crosslinked | Crosslinked | Crosslinked |
| | Mixing capability | | Mixed | Mixed | Could not be mixed |
| | Average coefficient of linear expansion (ppm/K) | | 121 | Not calculated | Not calculated |
| | Maimum value of differential coefficient of linear expansion (ppm/K) | | 141 | Not calculated | Not calculated |
| | Heat resistant temperature (° C.) | | 300 or more | 250 | — |
| | Low elongation stress ratio | | 1.1 | 1.8 | — |

As shown in FIG. 2, it was confirmed that the sample of Example 1 had a low and stable coefficient of linear expansion over the measurement temperature range in comparison with the sample of Comparative Example 1. The sample of Comparative Example 1 showed a large change in the differential coefficient of linear expansion in several temperature ranges. On the other hand, the sample of Example 1 according to the invention showed a small change in the differential coefficient of linear expansion over the measurement temperature range. It was also found that the sample of Example 1 had a differential coefficient of linear expansion smaller than that of the sample of Comparative Example 1.

As shown in Table 1, the following items were confirmed by Examples 1 to 8 according to the invention. Specifically, the fiber composite materials of Examples 1 to 8 had an average coefficient of linear expansion of 100 ppm (1/K) or less and a maximum value of the differential coefficient of linear expansion of 120 ppm (1/K) or less at −80 to 300° C. The fiber composite materials of Examples 1 to 8 and Comparative Example 1 had a heat resistant temperature of 300° C. or more. The fiber composite material of Comparative Example 1 had an average coefficient of linear expansion of 121 ppm (1/K) and a maximum value of the differential coefficient of linear expansion of 141 ppm (1/K). In Comparative Example 2, the coefficient of linear expansion was not calculated since the coefficient of linear expansion was unstable at −80 to 300° C. The sample of Comparative Example 2 had a heat resistant temperature of 250° C. Since the sample of Comparative Example 3 could not be mixed, the coefficient of linear expansion, heat resistant temperature, and low elongation stress ratio could not be measured.

The uncrosslinked sample of Example 2 showed almost the same results as the crosslinked sample of Example 1.

Therefore, it was confirmed that the fiber composite material according to the invention shows a small and stable thermal expansion over a wide temperature range.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A fiber composite material, comprising:
an elastomer;
carbon nanofibers having an average diameter of 0.7 to 15 nm and an average length of 0.5 to 100 micrometers; and fibers having an average diameter of 1 to 100 micrometers and an aspect ratio of 50 to 500,
the carbon nanofibers and the fibers being dispersed in the elastomer, and the elastomer including an unsaturated bond or a group exhibiting affinity to the carbon nanofibers,
wherein the fiber composite material includes the carbon nanofibers in an amount of 1 to 30 vol % and the fibers in an amount of 3 to 40 vol %, and has an average coefficient of linear expansion of 100 ppm (1/K) or less and a differential coefficient of linear expansion of 120 ppm (1/K) or less at −80 to 300° C.

2. The fiber composite material as defined in claim 1, wherein the fiber composite material has a ratio of a coefficient of linear expansion in an arbitrary direction X and a coefficient of linear expansion in a direction Y perpendicular to the direction X of 0.7 to 1.3 at −80 to 300° C.

3. The fiber composite material as defined in claim 1, wherein the carbon nanofibers have an aspect ratio of 50 or more.

4. The fiber composite material as defined in claim 1, wherein the fiber composite material is in an uncrosslinked form.

5. The fiber composite material as defined in claim 1, wherein the fiber composite material is in a crosslinked form.

6. The fiber composite material as defined in claim 1, wherein the elastomer has a molecular weight of 5,000 to 5,000,000.

7. The fiber composite material as defined in claim 1, wherein at least one of a main chain, side chain, and terminal chain of the elastomer includes at least one unsaturated bond or group selected from a double bond, a triple bond, and a functional group.

8. The fiber composite material as defined in claim 1, wherein a network component of the elastomer in an uncrosslinked form has a spin-spin relaxation time (T2n) measured at 30° C. by a Hahn-echo method using a pulsed nuclear magnetic resonance (NMR) technique of 100 to 3,000 microseconds.

9. The fiber composite material as defined in claim 1, wherein a network component of the elastomer in a crosslinked form has a spin-spin relaxation time (T2n) measured at 30° C. by a Hahn-echo method using a pulsed nuclear magnetic resonance (NMR) technique of 100 to 2,000 microseconds.

10. The fiber composite material as defined in claim 1, wherein the fibers are natural fibers.

11. The fiber composite material as defined in claim 1, wherein the fibers are metal fibers.

12. The fiber composite material as defined in claim 1, wherein the fibers are synthetic fibers.

13. The fiber composite material as defined in claim 1, wherein the fiber composite material has a heat resistant temperature of 300° C. or more.

14. A method of producing a fiber composite material, the method comprising:
mixing carbon nanofibers having an average diameter of 0.7 to 15 nm and an average length of 0.5 to 100 micrometers and fibers having an average diameters of 1 to 100 micrometers and an aspect ratio of 50 to 500 into an elastomer including an unsaturated bond or a group exhibiting affinity to the carbon nanofibers; and
dispersing the carbon nanofibers and the fibers by applying a shear force,
wherein the fiber composite material includes the carbon nanofibers in an amount of 1 to 30 vol % and the fibers in an amount of 3 to 40 vol %, and has an average coefficient of linear expansion of 100 ppm (1/K) or less and a differential coefficient of linear expansion of 120 ppm (1/K) or less at −80 to 300° C.

* * * * *